July 3, 1951 G. H. McLAUGHLIN ET AL 2,558,972
PORTABLE ELECTROMAGNETIC CLINOMETER
Filed May 17, 1950 2 Sheets-Sheet 2
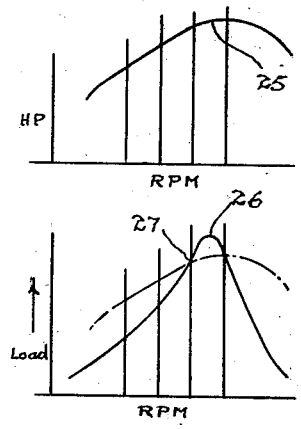
FIG.6.
FIG.7.
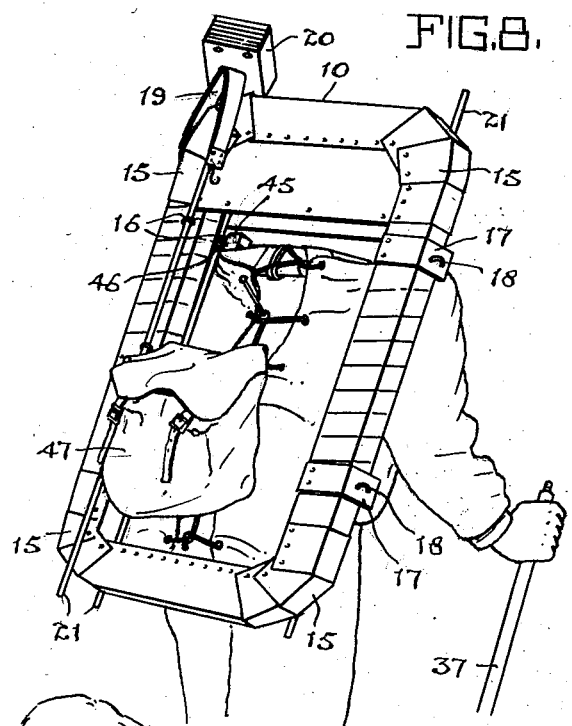
FIG.8.
FIG.9.
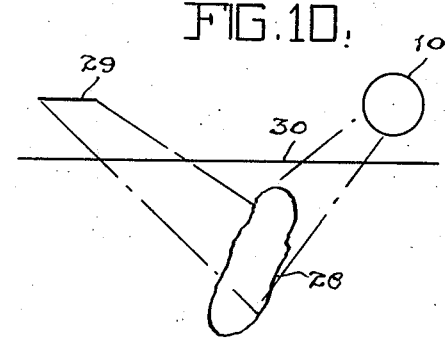
FIG.10.
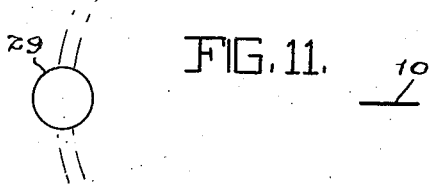
FIG.11.
Inventors
George H. McLaughlin
William A. Robinson
by Douglas S. Johnson
Agent Patented July 3, 1951

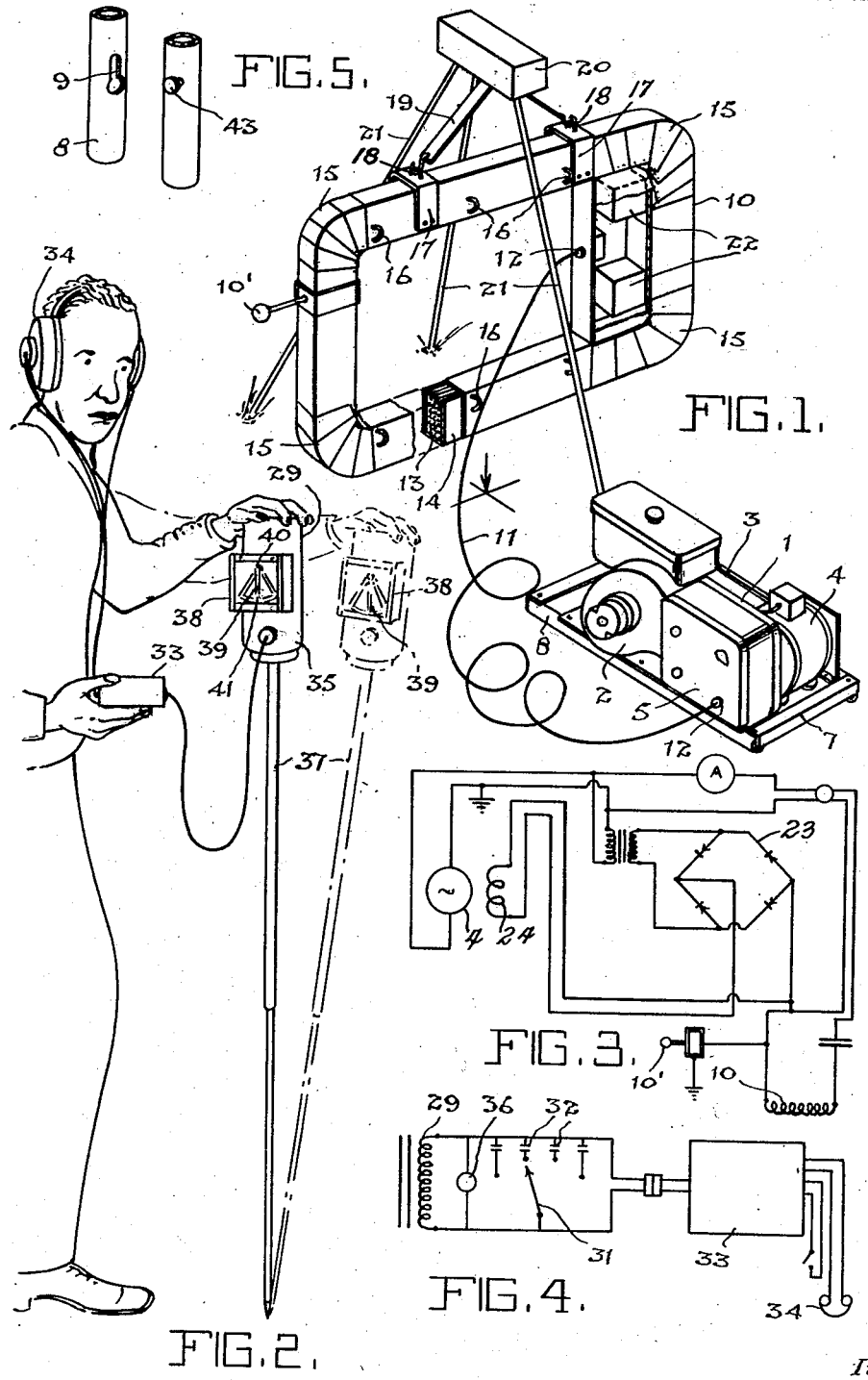

2,558,972

UNITED STATES PATENT OFFICE 2,558,972

PORTABLE ELECTROMAGNETIC
CLINOMETER

George H. McLaughlin and William A. Robinson, Toronto, Ontario, Canada, assignors to The McPhar Engineering Company of Canada Limited, Toronto, Ontario, Canada Application May 17, 1950, Serial No. 162,406
In Canada May 28, 1949

12 Claims. (Cl. 175—182)

1

This invention relates to a prospecting method and apparatus for locating subterranean conducting materials through the use of an exploring alternating magnetic field and a detector to indicate special angle changes of the magnetic field due to the presence of a conductor.

One specific object of importance of this invention is to provide a very much simplified method from methods previously used to enable measurements to be made in a very much shorter time and with more reliability.

Another important object is to provide an extremely light and compact apparatus which can be easily packed on the back and carried with facility through the bush or into other locations unaccessible to vehicles, such as are required to carry present apparatus.

Under present electromagnetic prospecting methods a large transmitting coil is set up and energized with an alternating electric current and a large air core detector coil is set up on a tripod which must be first carefully levelled before any readings can be taken to detect changes in the magnetic field caused by the presence of a conductor body.

A transmitter coil, which is usually in the form of a vertical triangle having a length of perhaps twenty feet per leg, is mounted on a truck or other vehicle and transported to the location where the survey is to be made.

Readings from a detector coil, which is also large and cumbersome, are then noted at various points by first setting up and levelling the supporting tripod and then rocking the coil on the tripod to obtain a null point in the earphones or other indicator. The displacement of the detector coil from a vertical position, which is the null position under the undisturbed magnetic field created by the transmitting coil where no conductor is available, is an indication of the presence of a conductor body, and by observing at various points information concerning the extent and position of the conductor body is obtained.

With existing apparatus, unless the tripod is very carefully and accurately levelled the readings obtained will be misleading and where the terrain is of an unaccessible nature to vehicles, surveying or prospecting is impossible.

It is therefore one of the prime objects of the present invention to provide an electromagnetic clinometer, which can be set up almost instantly in correct orientation for making accurate observations without any elaborate or time-consuming adjustments, decreasing materially the time previously required for conducting a survey.

2

A further object of the invention is to provide a clinometer apparatus in which the parts can be readily replaced and interchanged in the field.

The principal feature of the invention consists in providing in compact form to be packed on the back a light-weight rotary generator to form a source of alternating current, a transmitting coil tuned to the output frequency of the source to provide a large alternating magnetic field, a support for the transmitting coil to enable it to be suspended to assume a vertical position but adjustable in azimuthal position, and a novel magnetic cord detector coil to be set up in azimuthal alignment with the plane of the transmitting coil and supported to swing on an extended axis, the detector coil incorporating a direct reading indicator to immediately indicate the angle that the extended axis of the coil must be swung relative the vertical to obtain a null signal in the detector coil whereby the indicator indicates directly the spacial angle change of the magnetic field due to the presence of a conductor.

A further important feature consists in connecting the transmitting coil to load the rotary generator in a manner whereby the load of the transmitting coil serves to hold the frequency of the generator substantially constant.

A further important feature consists in utilizing a small compact printed circuit type amplifier for amplifying signals induced in the detector coil.

Another feature of the invention consists in forming the parts for ready inter-connection and for ready removal and replacement in the field without soldering or requiring any special tools.

Another important feature of the invention resides in the construction of a rotary generator and transmitting coil whereby these components can be quickly packed as back packs for transporting.

Another feature consists in providing a telescopic support for the detector coil forming an extended axis of the coil about which it can be swung and accommodating the position and height of the observer.

Referring to the accompanying drawings, Figure 1 is a perspective view illustrating the transmitter coil set up ready for use and connected to the rotary generator unit for energization.

Figure 2 is a perspective view of the detector unit illustrating the manner in which it is handled in obtaining a null point with regard to signal picked up through any magnetic field created upon energization of the transmitting coil.

Figure 3 is a schematic wiring diagram of the transmitting circuit.

Figure 4 is a part schematic part block diagram of the circuit of the detector unit.

Figure 5 is a perspective view illustrating the manner in which the frame posts of the rotary generator frame interlock with the frame members of a back pack.

Figure 6 is a graph of the horsepower output of the motor of the rotary generator plotted against revolutions per minute.

Figure 7 is a graph of the load represented by the tuned transmitting coil plotted against revolutions per minute, and showing the curve of Figure 6 superimposed thereon in broken line.

Figure 8 is a perspective view showing the manner in which the transmitting coil is incorporated as part of the back pack which also includes the receiver or detector coil, associated amplifier and head-phones.

Figure 9 is a perspective view of the motor generator unit included in a back pack or knapsack and showing a portion of the pack broken away to show the motor generator.

Figure 10 is a diagrammatic view illustrating in elevation the relationship of the transmitting and detector coils.

Figure 11 is a diagrammatic view illustrating the transmitting and detector coils in plan and in relation to conduct an investigation for any special angle of change of a magnetic field set up by the transmitting coil.

With reference to the drawings, Figure 1 shows in perspective a small portable rotary generator unit indicated generally as 1 which comprises a small motor 2 connected through a suitable belt drive 3 to a small alternating current generator 4.

Housed within the casing 5 is the meter 6 indicating the output of the generator and the circuit elements illustrated in Figure 3.

As much as possible of the unit 1 is formed of light weight aluminum and the various component parts are mounted in desired relation on the base 7 secured to the longitudinal tubes 8 provided at the ends with the keyhole slots 9 shown in Figure 5.

The motor itself may be provided with any suitable speed governor and the transmitter coil 10 is utilized to form a speed regulating load on the generator to hold the generator and motor speed relatively constant.

The output of the generator is preferably within the audio-frequency range and is connected to the transmitting coil 10 by the line 11 which, as shown, has plug connections 12 with the coil 10 and generator 1. The transmitting coil 10 consists of an air core coil having a number of turns of wire 13 housed in a rectangular frame 14 of U cross section, the frame being wound with a suitable tape and protected adjacent the corners with the leather 15.

The frame 14 carries a plurality of eyes 16 and in spaced relation along one side are brackets 17 carrying loops 18 to be connected with the suspension straps 19 carried by the head block 20 of a tripod unit, including legs 21 which may conveniently be ski poles.

Mounted on the transmitting coil are the tuning condensers 22 whereby the coil may be tuned to the output frequency of the generator 4 which is of the self-exciting type utilizing the rectifier circuit 23 to supply the excitation to its field 24, as shown in Figure 3.

It will be seen on reference to Figure 6 that the horsepower output of the motor 2 plotted against speed (R. P. M.) gives the curve 25, showing that over a portion of its range the horsepower delivered is almost directly proportional to the speed.

In Figure 7 the load represented by the transmitter coil and condensers 22 plotted against speed (R. P. M.) of the generator and hence motor, which in effect is the frequency of the generator, gives the curve 26.

The conditions of operation of the generator 4 are such that the resonant circuit of the transmitter coil and its condensers is utilized to maintain the generator speed and hence frequency substantially constant.

It will be understood that at a given speed there is a maximum power that the motor will supply to the generator. If the generator load is decreased the motor speeds up, or alternatively, if the generator load is increased the motor speed will decrease.

With reference to Figure 7 it will be seen that the operating point 27 of the generator is arranged to coincide with the slope of the load or resonant curve 26 of the transmitter.

It will be appreciated from Figure 7 that if the motor speeds up it must deliver more horsepower than it is able to supply the load represented by the transmitting coil on the generator and therefore its speed must necessarily decrease.

On the other hand, if the motor slows down the load represented by the transmitter coil on the generator rapidly decreases, allowing the motor to speed up again.

By this proper choice of operating conditions the speed of the motor and hence the frequency of the generator is maintained substantially constant.

With the transmitter coil 10 suspended in the manner illustrated in Figure 1 it will hang vertically but may be adjusted azimuthally for correct orientation.

Referring to the diagrammatic illustrations of Figures 10 and 11, it will be seen that the vertical transmitting coil 10 upon energization will create an alternating magnetic field which may be considered as a primary field which becomes linked with a vertical or approximately vertical conductor body or anomaly 28.

The linking of the magnetic field with this conductor anomaly 28 will set up in effect a secondary field of the same frequency as the primary field but in angular special relation therewith.

A detector or search coil 29 located above the surface 30 will respond to both a primary field directly from the transmitting coil and a secondary field from the conductor body, the two fields giving rise to a resultant field which may be detected.

In the operation of the method as shown in Figure 11 the detector or search coil is a horizontal coil and is arranged in alignment with the plane of the vertical transmitting coil 10 so that it will ignore any direct pickup of primary field from the transmitting coil.

The presence of the conductor anomaly however will create a secondary field giving rise to a resultant field which will not link with the detector coil in a manner to provide no signal with the arrangement of Figure 11, but a signal output from the detector coil will be indicated and the detector coil will have to be oriented in some other position in the resultant field for minimum or zero signal.

The measure of the deviation from a position of Figure 11 to give minimum signal gives an indication of the presence and direction of the resultant field. Thus it will be seen that in effect the presence of the conductor anomaly creates a change or disturbs the special angle of the magnetic field set up by the transmitting coil, and the detector coil in indicating such special angle change will indicate the presence of such conductor anomaly.

Referring to Figures 2 and 4, the receiving system of the apparatus consists of a search or detector coil 29 which, as shown in Figure 4, has a magnetic core, the coil preferably being wound in pye.

Connectable across the coil 29 through a selector switch 31 are a series of condensers 32 to selectively tune the coil 29 to the frequency of the magnetic field created by the transmitting coil 10.

Connected to the search coil assembly is an amplifier 33, the output of which is conducted to the ear-phones 34.

The coil 29 is mounted with its axis vertical within a Bakelite case 35, and arranged in the case to protect the coil from over-voltage in the vicinity of the transmitting coil is a neon bulb 36 connected across its terminals.

Removably secured to the bottom of the case 35 is a telescopic pole or rod 37 which coincides with the extended axis of the coil 29. Suspended on the front of the casing 35 is an indicating device 38 for indicating the angle that the rod 37 and hence the axis of the coil 29 makes with the vertical. This indicating device 38 may simply be a pendulum arm 39 pivoted at 40 and weighted at 41 adjacent its free end. Suitable damping devices may be incorporated to restrict the swinging of the arm 39.

The connection between the coil unit 29 and the amplifier 33 is formed to provide a plug connection so that the parts can be readily coupled together or detached for carrying.

The amplifier is in the form of a very small "printed" type amplifier, such as used in battery-operated hearing aids. All connections to and from the amplifier are made by suitable pin and socket connections for ready removal and replacement of the printed circuit and components in the field.

In using the equipment the transmitter coil 10 is set up and the detector or search coil 29 is set up in the same general plane as the transmitter coil, duplicating the conditions of Figures 10 and 11 and rocked on its extended axis in the form of the rod 37 until a null is heard in the ear-phones 34. If no conductor anomaly is present this null will be heard when the axis of the detector coil is vertical. Where a conductor anomaly 28 is nearby the null point will be obtained with the axis of the detector coil inclined at an angle to the vertical, which angle will be indicated directly by the arm 39.

The setting up of the apparatus is extremely simple with the legs 21 being quickly insertable into the head block 20 of the tripod and the transmitter coil 10 suspended to assume its own correct position of orientation under the action of gravity while being readily adjustable in azimuthal orientation.

The detector coil can be readily located on the same general line as the plane of the transmitter coil 10, and by the simple rocking movement described the null point of the detector coil obtained no elaborate or time-consuming setups are required and the observations can be made rapidly and with facility, giving reliable results in the minimum of time.

To protect the operator handling the transmitter coil against a high voltage discharge the frame of the coil is grounded as shown in Figure 3 and an insulating handle 10' connected to the frame as shown in Figure 1.

In lining up the transmitter and receiver coils 10 and 29 respectively, particularly where these coils are not in the same plane the one being above the other, it is highly desirable that they be accurately aligned not only so that the axis of the receiving coil lies in the plane of the transmitting coil but also so that the axis about which the pendulum arm 39 swings lies in the plane of the transmitting coil whereby swinging of the receiver coil back and forth in the plane of the transmitter coil will result in no movement or indication by the pendulum indicator.

To provide for accurate alignment of these coils it may be desirable to include a suitable sight on each, the sight on the transmitter coil aligning with the plane of the coil and the sight on the receiver coil aligning with the axis about which the pendulum 39 swings.

It will be understood that with the pendulum axis aligned with the transmitter coil the pendulum will indicate the true angle that the receiver coil has been swung laterally out of the vertical plane of the transmitter coil.

A back pack 42 is provided to house the rotary generator unit 1. The frame of this back pack 42 is provided with enlarged-headed studs 43 which engage in the keyhole slots 9 provided in the frame of the motor generator set whereby it is securely anchored to the back pack within the enclosing fabric 44.

The packed rotary generator unit 1 can be readily packed by a single man as shown in Figure 9. The remainder of the equipment can be readily carried by another man as shown in Figure 8.

In Figure 8 a back board 45 is provided with suitable eye extensions 46 to align with the eyes 16 carried by the rectangular frame 14 of the transmitter coil, and the legs 21 of the supporting tripod unit for the transmitter projected through the eyes 16 and 46 serve to secure the transmitter coil in position on the back board.

It will be seen that the size of the transmitter coil is sufficiently small to enable it to be readily carried on the back without forming a cumbersome or awkward unit. The remaining leg and the head block 20 can also be carried in the eye holders 16 provided.

A small additional knapsack 47 carrying the search coil 29, the tiny printed circuit amplifier 33 and the head-phones form an additional load for the man carrying the transmitter coil which is relatively light.

The pole or rod 37 is demountable from the casing 35 and may be useful as a walking stick as illustrated in Figure 8.

Thus the complete apparatus is very quickly packed and slung for transportation forming an extremely convenient clinometer apparatus for conducting electromagnetic surveys for subterranean conductor anomalies.

By employing the tuned transmitting coil the size of this coil has been enabled to be reduced to a size convenient for carrying and the loading of the rotary generator 1 as described permits a very simple light weight generator to be used as a source of alternating current having a high stability of frequency. Also the use of a magnetic or iron cord detector coil enables the field created with a tuned transmitting coil of the size to be carried to be detected sufficiently that the spacial angle change, due to the presence of a conductor, can be detected.

The importance of this clinometer apparatus, in both simplifying the method, in procedure of conducting geophysical surveys and enabling surveys to be carried out in hitherto unaccessible areas, will be readily appreciated, presenting a distinctive and significant advance in the art.

What we claim as our invention is:

1. A portable electromagnetic clinometer comprising a portable alternating current source, an air core transmitting coil connectable with said source, means for suspending said coil to hang vertically, a magnetic core detector coil, means supporting said latter coil to be swung on an extended axis, means for indicating the angle of said extended axis relative the vertical, and means for detecting a signal developed in said detector coil by any magnetic field pattern arising from the energization of said transmitting coil.

2. A portable apparatus for creating a magnetic field and indicating a spacial angle of change of the magnetic field due to the presence of a conductor comprising in combination a source of low frequency alternating current, a transmitting coil of a size to be mounted on a back pack connectable with said source to create a low frequency magnetic field, a support for said coil to maintain same in a vertical position, a search coil wound on a magnetic core, means to indicate the angular inclination of the axis of said latter coil relative the vertical, means to amplify the output of said search coil, and means to detect said amplified output.

3. A portable apparatus for creating a magnetic field and indicating spacial angular changes of the field due to nearby conductor bodies comprising a light weight motor-driven low frequency alternating current generator adapted to be mounted on a pack board, a transmitter coil adapted to be packed on the back connectable with and matched to said source to create a low frequency magnetic field, a collapsible support for supporting said coil in a vertical plane, a search coil having a magnetic core to detect magnetic fields set up by said transmitting coil, means to enable said search coil to be swung about an extended axis, means to detect signals developed in said search coil, and means to indicate the angular inclination from the vertical of the axis of said search coil for minimum signal output.

4. Apparatus as claimed in claim 3 in which said search coil is removably secured to the upper end of a pole coinciding with the axis of said search coil, said pole permitting the free swinging of said search coil through a vertical position as indicated by said angular indicator.

5. Portable electro-magnetic apparatus for detecting conductor anomalies comprising in combination, a low frequency alternating current motor-driven generator unit, a tuned transmitting coil connectable with said generator to create a low frequency magnetic field, support means for suspending said coil to hang freely in a vertical plane and swingable azimuthally, a search coil wound on a magnetic core and tuned to said low frequency magnetic field, a longitudinal rod projecting from said search coil coinciding with an extended axis of said search coil and forming a means to support said search coil to swing about said extended axis, gravity responsive means to indicate the angle between said rod and hence the axis of said search coil and the vertical, and means for amplifying and detecting a signal generated in said detector coil upon energization of the transmitting coil.

6. Apparatus as claimed in claim 5 in which said tuned transmitting coil is arranged to form a resonant load in accordance with the generator output capacity varying sharply with the change in frequency or generator speed to maintain the generator speed substantially constant.

7. Apparatus as claimed in claim 5 in which said motor-driven generator unit comprises a motor and a generator mounted on a base and of a size to fit within a back pack, and means on said base to interlock with the back pack to anchor said motor-driven generator unit for carrying.

8. A transmitting unit for an electromagnetic clinometer apparatus comprising a motor-driven alternating current generator, a tuned air core transmitting coil of a size to be carried on the back connectable with said generator to form a resonant load for said generator acting to effect frequency regulation thereof, and means to suspend said transmitting coil to hang freely in a vertical plane but orientable in azimuth.

9. A transmitter unit as claimed in claim 8 in which said support is in the form of a tripod having a head block, legs removably secured to said head block, and suspension means carried by said head block and removably attachable to said transmitting coil.

10. A transmitting unit as claimed in claim 8 in which said means to suspend said transmitting coil comprises a tripod having detachable legs and said transmitting coil is provided with eye projections forming keepers for said legs when detached, said legs forming means for attaching said transmitting coil to a back pack.

11. A method of prospecting for conductor materials consisting in creating a low frequency alternating magnetic field by means of a transmitting coil suspended to hang vertically and orientable in azimuth and detecting any spacial angle of change of the magnetic field due to the disturbing influence of a conductor material by swinging a search coil located generally in line with the plane of the transmitting coil on an extended axis, and noting the angular position of the axis of said search coil relative the perpendicular for minimum search coil signal.

12. A method as claimed in claim 11 in which said transmitting coil is energized to provide an audio-frequency magnetic field.

GEORGE H. McLAUGHLIN.
WM. A. ROBINSON.

REFERENCES CITED

The following references are of record in the file of this patent:

UNITED STATES PATENTS

| Number | Name | Date |
| --- | --- | --- |
| 1,526,391 | Stewart | Feb. 17, 1925 |
| 2,047,609 | Antranikan | July 14, 1936 |
| 2,066,135 | Barrett | Dec. 29, 1936 |
| 2,114,283 | Anderson | Apr. 19, 1938 |
| 2,160,356 | Fore | May 30, 1939 |
| 2,167,490 | Ryan | July 25, 1939 |
| 2,201,256 | Barrett | May 21, 1940 |